United States Patent
Liu et al.

(10) Patent No.: US 9,461,739 B2
(45) Date of Patent: Oct. 4, 2016

(54) WIRELESS COMMUNICATION METHOD, BASE STATION AND SYSTEM

(71) Applicant: Huawei Technologies Co., Ltd., Shenzhen, Guangdong (CN)

(72) Inventors: Sheng Liu, Shenzhen (CN); Rui Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 244 days.

(21) Appl. No.: 14/063,787

(22) Filed: Oct. 25, 2013

(65) Prior Publication Data

US 2014/0050487 A1 Feb. 20, 2014

Related U.S. Application Data

(63) Continuation of application No. PCT/CN2011/073330, filed on Apr. 26, 2011.

(51) Int. Cl.
*H04B 10/00* (2013.01)
*H04B 10/114* (2013.01)
(Continued)

(52) U.S. Cl.
CPC ......... *H04B 10/1149* (2013.01); *H04B 10/116* (2013.01); *H04B 10/1125* (2013.01);
(Continued)

(58) Field of Classification Search
CPC ............ H04B 10/1149; H04B 10/116; H04L 5/0007; H04W 88/08
USPC ....... 398/172, 201, 127, 189, 115, 118, 135, 398/140; 375/260
See application file for complete search history.

(56) References Cited

U.S. PATENT DOCUMENTS 6,005,694 A * 12/1999 Liu ...................... H04B 10/071
398/20
6,128,512 A * 10/2000 Trompower ........... H04B 1/707
375/E1.002

(Continued)

FOREIGN PATENT DOCUMENTS

| CN | 1545225 A | 11/2004 |
|---|---|---|
| CN | 101764630 A | 6/2010 |
| WO | WO 2011000090 A1 | 1/2011 |

OTHER PUBLICATIONS

Zeng et al., "Improvement of Date Rate by using Equalization in an Indoor Visible Light Communication System," IEEE, New York, New York (2008).

(Continued)

*Primary Examiner* — Ken N Vanderpuye
*Assistant Examiner* — Abbas H Alagheband
(74) *Attorney, Agent, or Firm* — Leydig, Voit & Mayer, Ltd.

(57) ABSTRACT

Embodiments of the present invention provide a wireless communication method, base station and system. The base station includes several LED lights and/or several VLC/IR receivers. The several LED lights are configured to send downlink signals in an OFDMA standard to a user terminal, and the several VLC/IR receivers are configured to receive uplink signals that are of an SC-FDMA standard and sent by the user terminal. The base station further includes a baseband signal processing unit configured to equate the several LED lights and/or the several VLC/IR receivers with radio remote units of an LTE mode to perform processing and resource management. The embodiments of the present invention are capable of reusing baseband signal processing and resource management manners in an existing LTE system, thereby simplifying resource management and baseband signal processing operations performed by the base station, and saving the base station resources.

23 Claims, 5 Drawing Sheets

(51) Int. Cl.
*H04B 10/112* (2013.01)
*H04L 5/00* (2006.01)
*H04B 10/116* (2013.01)
*H04W 72/04* (2009.01)
*H04W 88/08* (2009.01)
*H04W 28/06* (2009.01)
*H04W 72/00* (2009.01)

(52) U.S. Cl.
CPC ............. *H04L5/0007* (2013.01); *H04B 10/00* (2013.01); *H04B 10/114* (2013.01); *H04W 28/06* (2013.01); *H04W 72/00* (2013.01); *H04W 72/04* (2013.01); *H04W 88/08* (2013.01)

(56) References Cited

U.S. PATENT DOCUMENTS

| | | | | |
|---|---|---|---|---|
| 6,542,270 | B2* | 4/2003 | Perkins | G01S 1/70 398/140 |
| 7,583,901 | B2* | 9/2009 | Nakagawa | G09F 9/33 398/183 |
| 7,912,376 | B2* | 3/2011 | Rollins | H04B 10/1141 398/118 |
| 7,929,867 | B2* | 4/2011 | Nakagawa | G09F 9/33 398/172 |
| 8,050,227 | B2* | 11/2011 | Lee | H04L 1/1607 370/329 |
| 8,374,802 | B2* | 2/2013 | Treptow | G01N 31/00 702/32 |
| 8,428,469 | B2* | 4/2013 | Kim | H04W 72/048 398/127 |
| 8,463,130 | B2* | 6/2013 | Ma | H04B 10/1149 398/115 |
| 8,554,200 | B2* | 10/2013 | Ribeiro et al. | 455/424 |
| 8,639,124 | B2* | 1/2014 | Castor | H04B 10/1149 398/172 |
| 8,737,191 | B2* | 5/2014 | Freda | H04L 27/2602 370/208 |
| 9,001,802 | B2 | 4/2015 | Noh et al. | 370/338 |
| 9,059,800 | B2* | 6/2015 | Irie | H04B 10/1125 |
| 9,130,651 | B2* | 9/2015 | Tabe | H04B 1/3838 |
| 2002/0071161 | A1* | 6/2002 | Perkins | G01S 1/70 398/118 |
| 2004/0217881 | A1* | 11/2004 | Pedyash | H04Q 9/00 340/870.07 |
| 2005/0047134 | A1* | 3/2005 | Mueller | F21V 23/0442 362/231 |
| 2005/0180133 | A1* | 8/2005 | Feldstein | B66B 23/225 362/219 |
| 2006/0022214 | A1* | 2/2006 | Morgan | F21K 9/00 257/99 |
| 2006/0056855 | A1* | 3/2006 | Nakagawa | G09F 9/33 398/183 |
| 2007/0177161 | A1* | 8/2007 | Ishii | G01S 1/70 356/614 |
| 2007/0189772 | A1* | 8/2007 | Hyun | H04J 14/0226 398/71 |
| 2008/0304833 | A1* | 12/2008 | Zheng | H04B 10/1143 398/135 |
| 2008/0310850 | A1* | 12/2008 | Pederson | G07C 9/00158 398/135 |
| 2009/0022496 | A1* | 1/2009 | Shin | H04B 10/116 398/118 |
| 2009/0041240 | A1* | 2/2009 | Parkvall et al. | 380/247 |
| 2009/0297156 | A1* | 12/2009 | Nakagawa | G09F 9/33 398/130 |
| 2009/0297166 | A1* | 12/2009 | Nakagawa | G09F 9/33 398/172 |
| 2009/0310971 | A1 | 12/2009 | Kim et al. | |
| 2010/0129087 | A1* | 5/2010 | Kim | H04B 10/116 398/182 |
| 2010/0154023 | A1* | 6/2010 | Dey | H04N 21/41407 725/151 |
| 2010/0234035 | A1* | 9/2010 | Fujishima | H04L 5/001 455/450 |
| 2010/0296298 | A1* | 11/2010 | Martin, Jr. | A45D 42/10 362/311.06 |
| 2011/0044218 | A1* | 2/2011 | Kaur | H04W 72/1215 370/310 |
| 2011/0069962 | A1* | 3/2011 | Castor | H04B 10/1149 398/115 |
| 2011/0105134 | A1* | 5/2011 | Kim | H04W 72/048 455/450 |
| 2011/0149879 | A1* | 6/2011 | Noriega | H04W 72/1236 370/329 |
| 2011/0164878 | A1* | 7/2011 | Ma | H04B 10/1149 398/79 |
| 2011/0243570 | A1* | 10/2011 | Kim | H04B 10/114 398/140 |
| 2012/0032876 | A1* | 2/2012 | Tabe | H04B 1/3838 345/156 |
| 2012/0033540 | A1* | 2/2012 | Kim | H04B 7/0413 370/203 |
| 2012/0057872 | A1* | 3/2012 | Freda | H04L 27/2602 398/76 |
| 2012/0072979 | A1* | 3/2012 | Cha | G06F 21/34 726/7 |
| 2012/0230685 | A1* | 9/2012 | Jung | H04B 10/112 398/43 |
| 2012/0230696 | A1* | 9/2012 | Pederson | G07C 9/00158 398/115 |
| 2013/0083719 | A1* | 4/2013 | Seo | H04L 5/0057 370/312 |
| 2013/0126713 | A1* | 5/2013 | Haas | H04B 10/116 250/208.2 |
| 2013/0182691 | A1* | 7/2013 | Chmiel et al. | 370/336 |
| 2014/0029952 | A1* | 1/2014 | Liu | H04B 10/116 398/115 |
| 2014/0105607 | A1* | 4/2014 | Castor | H04B 10/1149 398/118 |
| 2015/0356894 | A1* | 12/2015 | Petrocy | G09F 13/005 40/545 |

OTHER PUBLICATIONS

Komine et al., "Fundamental Analysis for Visible-Light Communication System using LED Lights," IEEE Transactions on Consumer Electronics, vol. 50, No. 1, pp. 100-107, IEEE, New York, New York (Feb. 2004).

Hou et al., "Vertical Handover Decision-Making Algorithm Using Fuzzy Logic for the Integrated Radio-and-OW System," IEEE Transactions on Wireless Communications, vol. 5, No. 1, pp. 176-185, IEEE, New York, New York (Jan. 2006).

* cited by examiner

WIRELESS COMMUNICATION METHOD, BASE STATION AND SYSTEM

CROSS-REFERENCE TO RELATED APPLICATIONS

This application is a continuation of International Patent Application No. PCT/CN2011/073330, filed on Apr. 26, 2011, which is hereby incorporated by reference in its entirety.

FIELD OF THE INVENTION

The present invention relates to the field of communications technologies, and in particular, to a wireless communication method, base station and system.

BACKGROUND OF THE INVENTION

Future wireless cellular networks will be multi-layer. For example, in a HetNet scenario in a long term evolution (Long Term Evolution; LTE) standard, signals of a macrocell Macrocell in the future wireless cellular network will cover a large area, and blind areas of wireless services are eliminated as much as possible. Femtocells Femtocell or picocells Picocell will be deployed in hot areas under coverage of the macrocell. Therefore, signals of the Macrocell and signals of the Femtocell or Picocell coexist in these hot areas, forming two-layer wireless signal coverage.

Visible light communication is using a light emitting diode (Light Emitting Diode; LED) light as an emission source of a signal, and loading information onto the brightness of the LED light to perform transmission. The visible light communication may be applied in indoor lights and outdoor street lights, and these application scenarios are just in accordance with most Femtocell and Picocell application scenarios in a HetNet system.

In the prior art, a two-layer network formed by a radio frequency (Radio Frequency; RF) transmission mode and a visible light communication (Visible Light Communication; VLC) transmission mode may be used. However, in the prior art, the RF transmission manner and the VLC transmission manner use two resource management and signal processing manners respectively, and transmitted data streams need to be switched between two resource management and signal processing manners, so that resource management and signal processing operations executed by a base station are complex.

SUMMARY OF THE INVENTION

Embodiments of the present invention provide a wireless communication method, base station and system, so as to solve a problem in the prior art that resource management and signal processing operations executed by a base station are complex.

An embodiment of the present invention provides a base station, including several light emitting diode LED lights and/or several visible light communication VLC/infrared ray IR receivers, where the several light emitting diode LED lights are configured to send downlink signals of an orthogonal frequency division multiple access OFDMA standard to a user terminal;

the several VLC/IR receivers are configured to receive uplink signals that are of a single carrier frequency division multiple access SC-FDMA standard and sent by the user terminal; and the base station further includes: a baseband signal processing unit, configured to equate the several LED lights and/or the several VLC/IR receivers with radio remote units of a long term evolution LTE mode, and perform processing and resource management on the downlink signals sent by the several light emitting diode LED lights and/or the uplink signals received by the several VLC/IR receivers.

An embodiment of the present invention further provides a wireless communication method, including:

receiving uplink signals sent by a user terminal; and sending downlink signals to the user terminal, where the downlink signals are sent by several light emitting diode LED lights in an OFDMA standard, and/or the uplink signals are received by several visible light communication VLC/infrared ray IR receivers in a single carrier frequency division multiple access SC-FDMA standard; and the several LED lights and/or the several VLC/IR receivers are equated with radio remote units of a long term evolution LTE mode by a baseband signal processing unit, and processing and resource management are performed on downlink signals sent by the LED lights and an RF transmitter and uplink signals received by the RF receiver.

An embodiment of the prevent invention further provides a wireless communication system, including a user terminal and a base station, where the base station includes several light emitting diode LED lights and/or several visible light communication VLC/infrared ray IR receivers;

the several light emitting diode LED lights are configured to send downlink signals of an orthogonal frequency division multiple access OFDMA standard to the user terminal;

the several VLC/IR receivers are configured to receive uplink signals that are of a single carrier frequency division multiple access SC-FDMA standard and sent by the user terminal;

the base station further includes: a baseband signal processing unit, configured to equate the several LED lights and/or the several VLC/IR receivers with radio remote units of a long term evolution LTE mode, and perform processing and resource management on the downlink signals sent by several light emitting diode LED lights and/or the uplink signals received by the several VLC/IR receivers; and the user terminal is configured to send the uplink signals of the SC-FDMA standard to the base station and receive the downlink signals that are of the OFDMA standard and sent by the base station.

In the wireless communication method, base station and system provided by the embodiments of the present invention, the base station may equate the several LED lights for sending downlink VLC signals and/or the several VLC/IR receivers for receiving uplink VLC signals with radio remote units of a long term evolution LTE mode to perform baseband signal processing and resource management. Therefore, when an RF and VLC hybrid transmission manner is used, the VLC transmission manner is capable of reusing baseband signal processing and resource management manners in an existing LTE system, thereby simplifying resource management and baseband signal processing operations executed by the base station, and saving base station resources.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In a first embodiment of a base station provided by the present invention, the base station includes several light emitting diode LED lights and/or several visible light communication VLC/infrared ray IR receivers, where the several light emitting diode LED lights are configured to send downlink signals of an orthogonal frequency division multiple access OFDMA standard to a user terminal;

the several VLC/IR receivers are configured to receive uplink signals that are of a single carrier frequency division multiple access SC-FDMA standard and sent by the user terminal; and the base station further includes: a baseband signal processing unit, configured to equate the several LED lights and/or the several VLC/IR receivers with radio remote units of a long term evolution LTE mode, and perform processing and resource management on the downlink signals sent by the several light emitting diode LED lights and/or the uplink signals received by the several VLC/IR receivers.

The base station provided by the embodiment of the present invention may be a femtocell Femtocell or a picocell Picocell. The base station uses a VLC mode to perform downlink signal transmission of an orthogonal frequency division multiple access (Orthogonal Frequency Division Multiple Access; OFDMA) standard, and/or uplink signal transmission of a single carrier frequency division multiple access (Single Carrier Frequency Division Multiple Access; SC-FDMA) standard. The base station may further use the VLC mode and an RF mode to perform hybrid downlink signal transmission, and/or the VLC mode and the RF mode to perform hybrid uplink signal transmission.

In a current LTE transmission standard, an SC-FDMA standard is used in uplink transmission, and an OFDMA standard is used in downlink transmission. Therefore, in order to ensure that current LTE baseband signal processing and resource management can be reused when the VLC mode, or the VLC and RF hybrid mode is used for transmission, the uplink signals sent by the base stations in all the embodiments of the present invention should also use the SC-FDMA standard, the downlink signals should also use the OFDMA standard, which are not described in detail in the following embodiments again. A base station signal processing unit (can also be called Base Band Unit; BBU) may equate the several LED lights for sending downlink VLC signals and/or the several VLC/IR receivers for receiving uplink VLC signals with radio remote units (Radio Remote Unit; RRU) of a long term evolution LTE mode, and perform processing and resource management on the downlink signals sent by the several LED lights, and/or the uplink signals (namely, baseband signals) received by the several VLC/IR receivers. Equating the several LED lights and/or the several VLC/IR receivers with the radio remote units of the long term evolution LTE mode may be equating the several LED lights and/or the several VLC/IR receivers with LTE sectors or with LTE carriers.

Specifically, when only a VLC transmission manner is used for the downlink signals, the several LED lights may be grouped into several LED light groups according to a physical space distance, and each LED light group may send a downlink signal having an independent frame structure, so that in a downlink direction, each LED light group may be equated with one LTE base station sector. When only a VLC/IR transmission manner is used for the uplink signals, each VLC/IR receiver may be used to receive an uplink signal that has an independent frame structure and is sent by the user terminal, so that in an uplink direction, each VLC/IR receiver may be equated with one LTE base station sector. It can be understood that, when the downlink signals and the uplink signals are both transmitted in the VLC manner, each LED light group and its corresponding VLC/IR receiver may be equated with one LTE base station sector. When a VLC and RF hybrid transmission manner is used for the downlink signals, the several LED lights may be grouped into several LED light groups according to a physical space distance, and each LED light group may be equated with one LTE carrier, so that several LTE carriers (an RF transmission manner corresponds to one RF carrier, and each LED light group corresponds to one equivalent carrier) exist in the downlink direction.

Through the foregoing equation, when the RF and VLC hybrid transmission manner is used, the VLC transmission manner is capable of reusing baseband signal processing and resource management manners in an existing LTE system, thereby simplifying resource management and baseband signal processing operations executed by the base station, and saving base station resources.

In addition, when the base station is a Femtocell or a Picocell, the wireless communication system may further use a macrocell Macrocell to provide large RF signal coverage, and the Femtocell or the Picocell may be located within coverage of the Macrocell, or a coverage hole of the Macrocell. Therefore, when a VLC signal is interrupted, the user terminal may be handed over to a cell in the coverage of the Macrocell, and communicate by using an RF signal.

The base station provided by the embodiment of the present invention may further be a Macrocell. In this case, on a basis of providing RF uplink signals and RF downlink signals, the base station may use several LED lights to assist in downlink transmission and/or use several VLC/IR receivers to assist in uplink transmission. Similarly, in the downlink direction, the several LED lights may be grouped into several LED light groups according to a physical space distance, and each LED light group may be equated with one LTE carrier, so that several equivalent LTE carriers exist in the downlink direction (that is, each LED light group corresponds to one equivalent carrier), which are similar to the equivalent carriers in the uplink direction.

In the base station provided by the embodiment of the present invention, the base station may equate the several LED lights for sending the downlink VLC signals and/or the several VLC/IR receivers for receiving the uplink VLC signals with radio remote units of a long term evolution LTE mode to perform baseband signal processing and resource management. Therefore, when the RF and VLC hybrid transmission manner is used, the VLC transmission manner is capable of reusing baseband signal processing and resource management manners in the existing LTE system, thereby simplifying resource management and baseband signal processing operations executed by the base station, and saving base station resources.

In a second embodiment of a base station provided by the present invention, the base station being a Femtocell is taken as an example for description, but does not serve as a limitation on the present invention. The base station may also be a Picocell. The Femtocell is in coverage of a Macrocell, or in a coverage hole of the Macrocell. A VLC mode is used in downlink transmission of the Femtocell, and multiple LED light groups are used as downlink transmitting antennas to send signals to a user terminal. A VLC mode or an IR mode is used in uplink transmission of the Femtocell.

It should be noted that, if light of different colors is used as carriers in the uplink transmission and the downlink transmission, a time division duplexing (Time Division Duplexing; TDD) manner or a frequency division duplexing (Frequency Division Duplexing; FDD) manner may be used in the uplink and downlink data transmission. However, if light of a same color is used as carriers in the uplink transmission and downlink transmission, the TDD manner needs to be used in the uplink and downlink data transmission.

Several LED lights may be installed indoors or outdoors, and may be grouped into multiple LED light groups according to a physical space distance, for example: in an indoor space including several rooms, one LED light group may be disposed in each room to send a downlink signal to the user terminal, and one VLC/IR receiver may be disposed in each room to receive an uplink signal from the user terminal. An indoor space without room division may be divided into multiple different areas according to a space distance. One LED light group is disposed in each area, and one VLC/IR receiver may be disposed in each area correspondingly.

In the VLC or IR mode, a signal does not have any penetrability, and is quickly attenuated in the space. Therefore, a transmitted spectrum may be reused in the space to improve overall throughput of the system.

Figure 1:
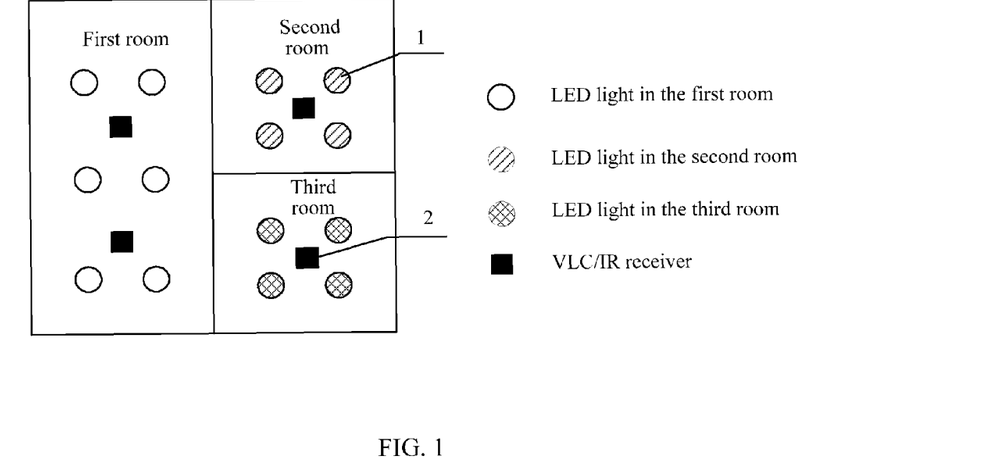
FIG. 1 is a schematic structural diagram of a second embodiment of a base station according to the present invention.
Figure 2:
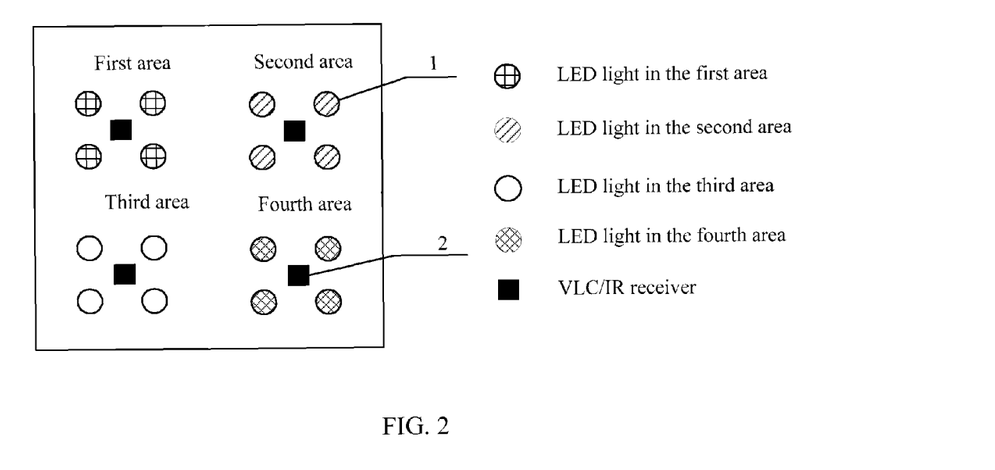
FIG. 2 is another schematic structural diagram of a second embodiment of a base station according to the present invention.

In this embodiment, cases shown in FIG. 1 and FIG. 2 are taken as examples for description. FIG. 1 shows that one LED light group (each LED light group may include multiple LED lights 1) is installed in each of three rooms indoors, each LED light group is used as a downlink antenna of a base station, and one VLC/IR receiver 2 is installed in each room correspondingly. FIG. 2 shows that one LED light group is installed in each of four indoor areas, and one VLC/IR receiver 2 is installed in each area correspondingly.

An uplink signal and a downlink signal interfere with each other only in a small area (for example, near a door to a room). Therefore, different rooms may transmit different signals independently, that is, different rooms may transmit signals having independent LTE frame structures. Specifically, each LED light group may be provided with signals through a same line link, and the line link may be an optical fiber, a power line or other types of wired transmission media. All LED lights 1 in each LED light group send signals having a same LTE frame structure. Different LED light groups are provided with signals through different line links, and each LED light group sends downlink signals having an independent frame structure to the user terminal. Similarly, each VLC/IR receiver 2 receives uplink signals that have an independent frame structure and are sent by the user terminal.

Therefore, each LED light group and a VLC/IR receiver 2 corresponding to the LED light group may be equated with one base station sector corresponding to one cell, and the cell has uplink and downlink frame structures independent of those of other LED light groups (namely, other sectors).

One LED light group may be further divided into multiple LED light subgroups, and LED lights 1 in each LED light subgroup send same signals. However, each LED light subgroup is configured to send a downlink signal of a different layer in a same frame structure to the user terminal. In this way, each LED light subgroup in one group of LED lights may be equated with one antenna of LTE multiple-input multiple-output (Multiple-Input Multiple-Out-put; MIMO).

Figure 3:
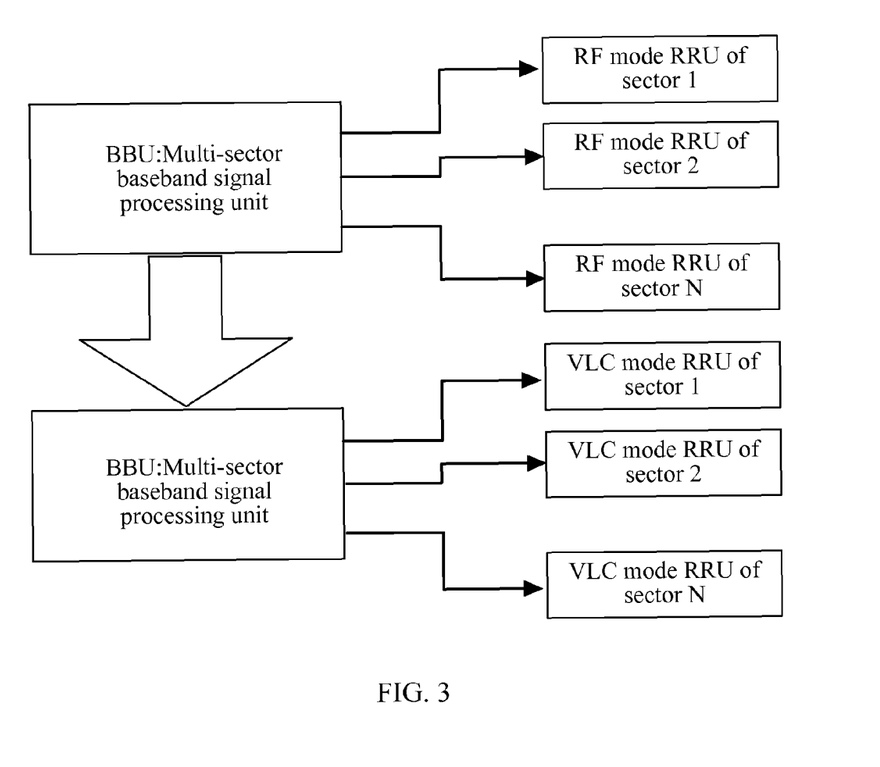
FIG. 3 is an equivalent schematic diagram of baseband signal processing and resource management performed by a base station according to the present invention.

Through the above equation, the VLC transmission mode in the coverage of the base station may use an LTE protocol, a baseband processing unit of the base station may equate each LED light group and the VLC/IR receiver 2 corresponding to the LED light group with one base station sector having an independent air interface, and perform processing and resource management on the downlink signals sent by the LED light groups and the uplink signals (namely, baseband signals) received by the VLC/IR receivers 2, as shown in FIG. 3. The baseband signal processing and resource management may be specifically: for a user terminal suffering interference less than or equal to a threshold, controlling a current equivalent base station sector to send a downlink signal to the user terminal and perform uplink signal detection; for a user terminal suffering interference greater than the threshold, controlling the current equivalent base station sector and an interfering equivalent base station sector together to send downlink signals to the user terminal and perform uplink signal detection. In the baseband processing of the base station, an existing design may be reused as much as possible, for example, existing sector handover or cooperative transmission of sector edges is reused, thereby simplifying resource management and signal processing operations executed by the base station and saving base station resources.

In a third embodiment of a base station provided by the present invention, the base station being a Femtocell is still taken as an example for description, and the Femtocell is in coverage of a Macrocell, or in a coverage hole of the Macrocell. A VLC mode is used in downlink transmission of the base station, and an RF mode is used in uplink transmission of the base station.

Figure 4:
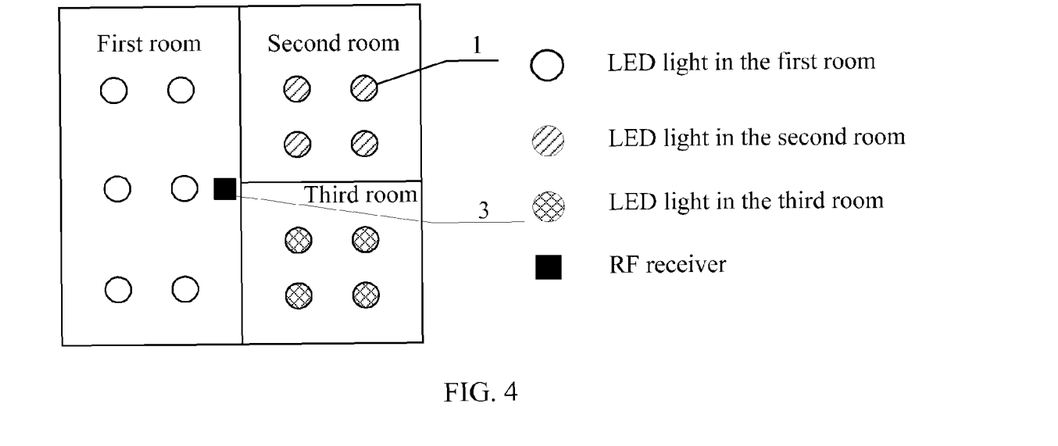
FIG. 4 is a schematic structural diagram of a third embodiment of a base station according to the present invention.
Figure 5:
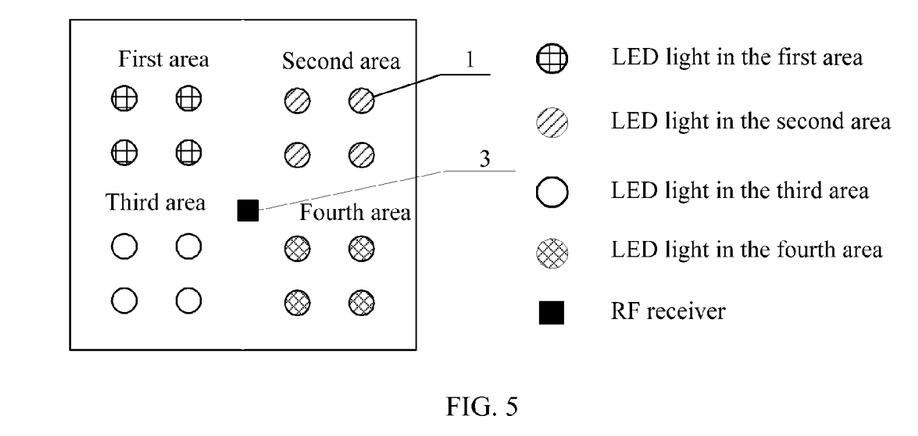
FIG. 5 is another schematic structural diagram of a third embodiment of a base station according to the present invention.

Referring to FIG. 4 and FIG. 5, in this embodiment, a setting method of multiple LED light groups sending downlink signals to a user terminal is the same as that in the previous embodiment. A difference from the previous embodiment lies in that: in this embodiment, the base station uses the RF mode in the uplink direction. The VLC mode does not have penetrability, so signal coverage in this mode is a room. However, the RF mode has penetrability, and new coverage in this mode is three rooms, that is, uplink coverage of an RF signal is greater than downlink coverage of a VLC signal. Therefore, in an uplink direction, uplink signals of three rooms may be received by a same RF receiver 3.

The baseband processing unit of the base station may equate one LED light group with one downlink sector of the base station, and perform processing and resource management on downlink signals sent by LED light groups and uplink signals received by a RF receiver 3. A downlink signal sent by each sector has an independent frame structure, that is, intra-frame user scheduling in different sectors are independent of each other.

For the uplink signals received by the RF receiver 3, uplink signals of the user terminal in different rooms interfere with each other. In order to avoid interference, in the uplink direction, different base station sectors have a unified uplink frame structure. Different equivalent base station sectors receive uplink signals sent by the user terminal on different time frequency resources, and the uplink signals sent by user terminals in different equivalent base station sectors have a unified user identifier.

In order to ensure that the above frame structure can operate correctly, the user terminals in different equivalent base station sectors send same random access sequences in different positions of the uplink signals, or the user terminals in different equivalent base station sectors send different random access sequences in the uplink signals, so that upon receiving an uplink signal, the base station knows which sector the uplink signal belongs to, and that random access responses and uplink resource allocation of different sectors are independent of each other.

In a fourth embodiment of a base station provided by the present invention, an RF mode and a VLC\IR hybrid transmission mode are used in downlink transmission of the base station, and an RF mode is used in uplink transmission.

Figure 7:
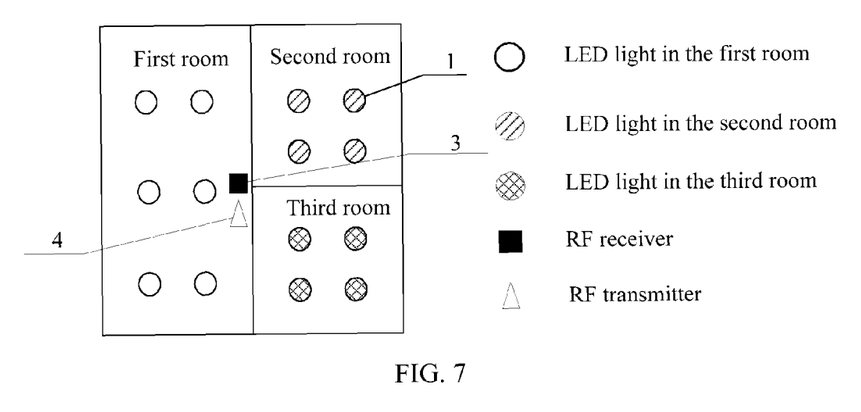
FIG. 7 is a schematic structural diagram of a fourth embodiment of a base station according to the present invention.
Figure 8:
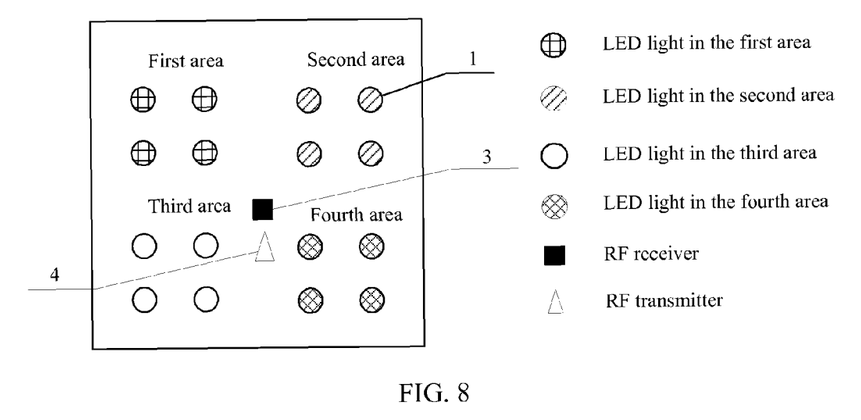
FIG. 8 is another schematic structural diagram of a fourth embodiment of a base station according to the present invention.

Each LED light group is obtained by grouping according to an indoor physical space distance. As shown in FIG. 7, in an indoor space including three rooms, one LED light group is disposed in each room to send downlink signals to a user terminal. An RF signal has penetrability, so one RF receiver 3 may be disposed indoors to receive an uplink signal from the user terminal, and one RF transmitter 4 may be disposed indoors to send a downlink signal to the user terminal. As shown in FIG. 8, indoor space without room division may be divided into four different areas according to a space distance, one LED light group is disposed in each area, and one RF receiver 3 is disposed indoors.

LED lights in a same LED light group are provided with downlink signals through a same line link and transmit downlink signals having same LTE frame structure.

When LTE signals are transmitted in the RF and VLC\IR hybrid mode, a downlink RF spectrum may be used as a basic carrier, and a VLC spectrum of each LED light group is equated with a different independent carrier, that is, VLC spectrums of LED light groups in different rooms or different areas may be equated with different independent carriers. Therefore, the base station may be regarded as an LTE system with four equivalent carriers, and the equivalent carriers include an RF spectrum and VLC spectrums corresponding to the first room, the second room and the third room respectively. It should be noted herein that, although light spectrums actually used by downlink signals sent by LED lights of the three rooms may be the same, the spectrums are regarded as independent equivalent carriers because interference with each other is low. Therefore, a baseband signal processing unit may use a carrier aggregation technology in a conventional LTE system to perform carrier aggregation processing and resource management on downlink signals sent by the LED light groups and the RF transmitter 4, and uplink signals (namely, baseband signals) received by the RF receiver 3. For example, the user terminal in the first room may use two equivalent carriers, namely, the RF spectrum and a VLC spectrum of the first room, to receive downlink data.

Different LED light groups may actually use a same light spectrum to transmit downlink data, so the RF transmitter may broadcast, in a downlink channel of the RF carrier, the number of equivalent independent carriers supported by the base station and LED light group identifiers corresponding to the equivalent independent carriers, for example, LED light group numbers.

It should be noted that, when sending a downlink frame on an equivalent carrier, each LED light group needs to broadcast, in the downlink frame of the equivalent carrier and according to a certain period, a LED light group identifier corresponding to a equivalent independent carrier, so that after receiving the LED light group identifier, the user terminal may determine whether the used equivalent carrier changes. If changes, the user terminal needs to give feedback to the base station, thereby implementing a switch of the equivalent carrier.

In addition, when an FDD duplexing manner is used in a conventional RF mode, uplink and downlink spectrum pairing is fixed, that is, after the user terminal knows a downlink spectrum, an uplink spectrum can also be known. However, when the VLC mode is used in the downlink transmission, the user terminal is incapable of knowing the uplink transmission spectrum. Therefore, if a downlink signal is transmitted only in the VLC/IR mode, each LED light group may be used to broadcast, in the downlink signal, uplink spectrum information of a corresponding equivalent base station sector.

In the above second embodiment to fourth embodiment of the base station, the base station may be a Femtocell or a Picocell. When the base station is a Macrocell, multiple LED light groups may also be used to send downlink signals to the user terminal, so as to assist in downlink transmission of the RF mode, and the VLC/IR receivers 2 may also be used to receive the uplink signals sent by the user terminal, so as to assist in uplink transmission of the RF mode. In this case, each LED light group in the Macrocell may be equated with a downlink carrier, and each VLC/IR receiver 2 in the Macrocell may be equated with an uplink carrier to transmit signals.

In the first embodiment to the fourth embodiment of the base station, in a Femtocell or Picocell that uses the VLC mode in an uplink and/or downlink, positions where signal transmitting ends and receiving ends are placed may be far away from each other, and the number of the signal transmitting ends may be different from that of the signal receiving ends, causing difference in quality of uplink and downlink signals. An existing LTE cell handover procedure is decided based on quality of a downlink channel. However, this method may hand over a user to a cell that has good downlink channel quality but has poor uplink channel quality.

Figure 6:
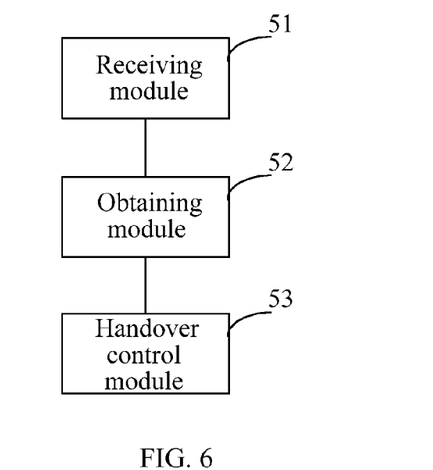
FIG. 6 is a schematic structural diagram of a base station processing unit in a base station according to an embodiment of the present invention.

In order to improve quality of cell handover, the embodiment of the present invention further provides a cell handover method, and the cell handover method is executed by a baseband processing unit of a target base station. FIG. 6 is a schematic structural diagram of a base station processing unit in a base station according to an embodiment of the present invention, where the baseband processing unit may include a receiving module 51, an obtaining module 52, and a handover control module 53, where the receiving module 51 is configured to receive downlink channel quality of the target base station and a user terminal, and uplink and downlink channel quality of the serving base station and the user terminal, where the downlink channel quality of the target base station and the user terminal, and the uplink and downlink channel quality of the serving base station and the user terminal are sent by a current serving base station of the user terminal;

the obtaining module 52 is configured to obtain uplink channel quality of the target base station and the user terminal from a random access signal sent by the user terminal, where downlink signals transmitted on a downlink channel of the target base station and the user terminal are sent by the several LED lights, and/or uplink signals transmitted on an uplink channel of the target base station and the user terminal are received by the several VLC/IR receivers; and the handover control module 53 is configured to determine whether to hand over the user terminal from the serving base station to the target base station, according to uplink and downlink channel quality of the target base station and the user terminal, and the uplink and downlink channel quality of the serving base station and the user terminal.

Specifically, the serving base station may be a base station of any existing type, or the base station provided in the embodiment of the present invention. The user terminal may search for a downlink signal according to a command of the serving base station or according to a certain period by itself, detect quality of the downlink signal, and feed back a detection result to the serving base station. If the serving base station determines to hand over the user terminal to a target base station that sends a VLC signal, the user terminal sends a random access signal to the target base station, so as to implement synchronization with the target base station. At the same time, a receiving module 51 of the target base station may receive, through an X2 interface, the uplink and downlink channel quality of the serving base station and the user terminal sent by the serving base station, and the downlink channel quality of the target base station and the user terminal. An obtaining module 52 of the target base station may obtain uplink channel quality of the target base station and the user terminal from the random access signal sent by the user terminal. Therefore, the obtaining module 52 of the target base station is capable of obtaining the uplink and downlink link quality from the user terminal to the target base station and to the serving base station.

Further, a handover control module 53 of the target base station may determine whether to hand over the user terminal from the serving base station to the target base station according to the uplink and downlink link quality. The handover control module 53 may determine whether to perform handover by using various methods. For example, it may be assumed that H11 and H12 are uplink and downlink channel gains from the user terminal to the serving base station, H21 and H22 are uplink and downlink channel gains from the user terminal to the target base station, and W1 and W2 are uplink and downlink weights; then, if W1*H11+W2*H12 is less than W1*H21+W2*H22, the handover control module 53 performs handover, otherwise the handover is not performed.

The target base station uses VLC transmission or an RF and VLC hybrid transmission manner in a downlink. However, data transmission of the VLC mode depends on whether a direct path between a base station and the user terminal is blocked by an obstacle, thereby causing communication interruption.

For example, a VLC downlink signal may be interrupted when a user puts a mobile phone into a pocket, or a user moves from one sector to another sector but some areas between the sectors have no VLC downlink signal. In view of this case, the embodiment of the present invention further provides a handover method.

After accessing a Femtocell or Picocell of a VLC mode, a user terminal needs to maintain synchronization with a Macrocell signal. The user terminal may receive a synchronous signal of a Macrocell according to a certain period and maintain synchronization with the Macrocell. If time when the user terminal fails to receive a downlink VLC signal exceeds a set threshold, or within a threshold, feedback from a serving base station is not received for an uplink signal which is of the user terminal and needs feedback, the user terminal may send a random access signal to the Macrocell, so as to hand over to the Macrocell.

Figure 9:
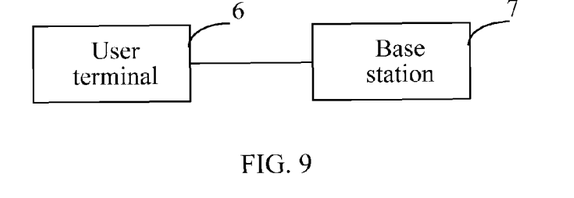
FIG. 9 is a schematic structural diagram of a first embodiment of a wireless communication system according to the present invention.

FIG. 9 is a schematic structural diagram of a first embodiment of a wireless communication system according to the present invention. As shown in FIG. 9, the wireless communication system includes a user terminal 6 and a base station 7, where the base station 7 includes several light emitting diode LED lights and/or several visible light communication VLC/infrared ray IR receivers;

the several light emitting diode LED lights are configured to send downlink signals of an orthogonal frequency division multiple access OFDMA standard to the user terminal 6;

the several VLC/IR receivers are configured to receive uplink signals that are of a single carrier frequency division multiple access SC-FDMA standard and sent by the user terminal 6;

the base station 7 further includes: a baseband signal processing unit, configured to equate the several LED lights and/or the several VLC/IR receivers with radio remote units of a long term evolution LTE mode, and perform processing and resource management on the downlink signals sent by several light emitting diode LED lights and/or the uplink signals received by the several VLC/IR receivers; and the user terminal 6 is configured to send the uplink signals of the SC-FDMA standard to the base station 7, and receive the downlink signals that are of the OFDMA standard and sent by the base station.

Furthermore, the several LED lights of the base station 7 are grouped into multiple LED light groups according to a space distance, and each LED light group is configured to send, to the user terminal, a downlink signal that is of the OFDMA standard and has an independent frame structure.

The base station 7 involved in the embodiment of the present invention may be a femtocell Femtocell or a picocell Picocell. The base station 7 uses a VLC mode to perform downlink signal transmission of the OFDMA standard, and/or uplink signal transmission of the SC-FDMA standard. The base station 7 may further use a VLC mode and an RF mode to perform hybrid downlink signal transmission, and/or use the VLC mode and RF mode to perform hybrid uplink signal transmission.

The BBU in the base station 7 may equate the several LED lights for sending downlink VLC signals and/or the several VLC/IR receivers for receiving uplink VLC signals with RRUs of the long term evolution LTE mode, and perform processing and resource management on the downlink signals sent by the several LED lights, and/or the uplink signals (namely, baseband signals) received by the several VLC/IR receivers. Equating the several LED lights and/or the several VLC/IR receivers with the radio remote units of the long term evolution LTE mode may be equating the several LED lights and/or the several VLC/IR receivers with LTE sectors, or with LTE carriers.

Through the equation, when an RF and VLC hybrid transmission manner is used, a VLC transmission mode is capable of reusing baseband signal processing and resource management manners in an existing LTE system, thereby simplifying resource management and baseband signal processing operations executed by the base station, and saving base station resources.

The base station 7 involved in the embodiment of the present invention may further be a Macrocell. In this case, on a basis of providing RF uplink signals and RF downlink signals, the base station 7 may use several LED lights to assist in downlink transmission and/or use several VLC/IR receivers to assist in uplink transmission. Similarly, in a downlink direction, the several LED lights may be grouped into several LED light groups according to a physical space distance. Each LED light group may be equated with one LTE carrier. In this way, several equivalent LTE carriers exist in the downlink direction, and equivalent carriers in the uplink direction are similar thereto.

In the wireless communication system provided by the embodiment of the present invention, the base station may equate the several LED lights for sending the downlink VLC signals and/or the several VLC/IR receivers for receiving the uplink VLC signals with the radio remote units of the long term evolution LTE mode to perform baseband signal processing and resource management. Therefore, when the RF and VLC hybrid transmission manner is used, the VLC transmission manner is capable of reusing baseband signal processing and resource management manners in an existing LTE system, thereby simplifying resource management and baseband signal processing operations executed by the base station, and saving base station resources.

Persons of ordinary skill in the art may understand that all or part of the procedures of the methods in the foregoing embodiments may be implemented by a computer program instructing relevant hardware. The program may be stored in a computer readable storage medium. When the program is run, the procedures of the methods in the embodiments are performed. The storage medium may be a magnetic disk, an optical disk, a read-only memory (Read-Only Memory, ROM), a random access memory (Random Access Memory, RAM), or the like.

Figure 10:
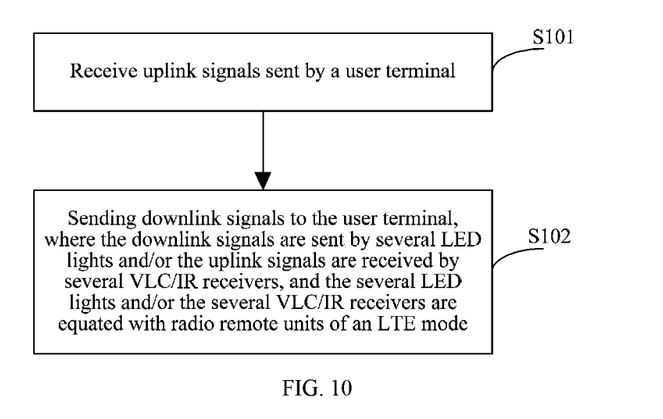
FIG. 10 is a flow chart of a first embodiment of a wireless communication method according to the present invention.

FIG. 10 is a flow chart of a first embodiment of a wireless communication method according to the present invention. As shown in FIG. 10, the method includes:

S101: Receive uplink signals sent by a user terminal.

S102: Send downlink signals to the user terminal, where the downlink signals are sent by several light emitting diode LED lights in an OFDMA standard, and/or the uplink signals are received by several visible light communication VLC/infrared ray IR receivers in a single carrier frequency division multiple access SC-FDMA standard, the several LED lights and/or the several VLC/IR receivers are equated with radio remote units of a long term evolution LTE mode by a baseband signal processing unit, and processing and resource management are performed by the baseband signal processing unit on the downlink signals sent by the several light emitting diode LED lights and/or the uplink signals received by the several VLC/IR receivers.

An executor of the above steps is a base station, and the base station may be a femtocell Femtocell or a picocell Picocell, and may also be a Macrocell.

As a feasible implementation manner, the sending the downlink signals of the OFDMA standard to the user terminal in S102 may specifically be:

sending, by each LED light group, a downlink signal having an independent frame structure to the user terminal, where the LED light group is obtained by grouping the several LED lights according to a space distance.

The receiving the uplink signals sent by the user terminal in S101 may specifically be:

receiving, by the VLC/IR receivers, the uplink signals that are of the SC-FDMA standard, have independent frame structures and are sent by the user terminal, where each of the VLC/IR receivers corresponds to one LED light group.

Each LED light group and its corresponding VLC/IR receiver are equated with one base station sector of the LTE mode by the baseband signal processing unit, and the baseband signal processing unit performs processing and resource management on the downlink signals sent by the LED light groups and the uplink signals received by the VLC/IR receivers.

As another feasible implementation manner, the receiving the downlink signal sent by the user terminal in S101 may specifically be:

receiving, by a radio frequency RF receiver, uplink signals that are of the SC-FDMA standard, have a unified frame structure and are sent by the user terminal, where each LED light group is equated with one base station sector of the LTE mode by the baseband signal processing unit, and the processing and resource management are performed by the baseband signal processing unit on the downlink signals sent by the LED light groups and the uplink signals received by the RF receiver.

The receiving, by the radio frequency RF receiver, the uplink signals that are the SC-FDMA standard, have the unified frame structure and are sent by the user terminal specifically is:

receiving, by the RF receiver, uplink signals that are sent by the user terminal for different equivalent base station sectors on different time frequency resources of the uplink signals that are of the SC-FDMA standard and have the unified frame structure, where the user terminal in the different equivalent base station sectors has a unified user identifier.

The method may further include:

receiving, by the RF receiver, same random access sequences that are in different positions of the uplink signals and are sent by the user terminal in different equivalent base station sectors, or receiving, by the RF receiver, different random access sequences that are in the uplink signals and are sent by the user terminal in different equivalent base station sectors.

As still another feasible implementation manner, the receiving the uplink signal sent by the user terminal in S101 specifically is: receiving, by the RF receiver, an uplink signal that is of the SC-FDMA standard and sent by the user terminal on an independent RF carrier.

The sending the downlink signals to the user terminal in S102 specifically is: sending, by the RF transmitter and each LED light group, downlink signals of the OFDMA standard to the user terminal, where the LED light group is obtained by grouping the several LED lights according to the space distance, each LED light group is equated with one independent carrier of the LTE mode by the baseband signal processing unit, and carrier aggregation processing and resource management are performed by the baseband signal processing unit on the downlink signals sent by the LED light group and the RF transmitter, and the uplink signals received by the RF receiver.

The method may further include: broadcasting, by the RF transmitter and in a downlink channel of the RF carrier, the number of the equivalent independent carriers supported by the base station and their corresponding LED light group identifiers.

The method may further include: broadcasting, by each LED light group and in a downlink channel of an equivalent independent carrier, a LED light group identifier corresponding to the equivalent independent carrier.

If the downlink signal is transmitted only in the VLC/IR mode, the method may further include: using each LED light group to broadcast, in a downlink signal, uplink spectrum information of a corresponding equivalent base station sector.

Figure 11:
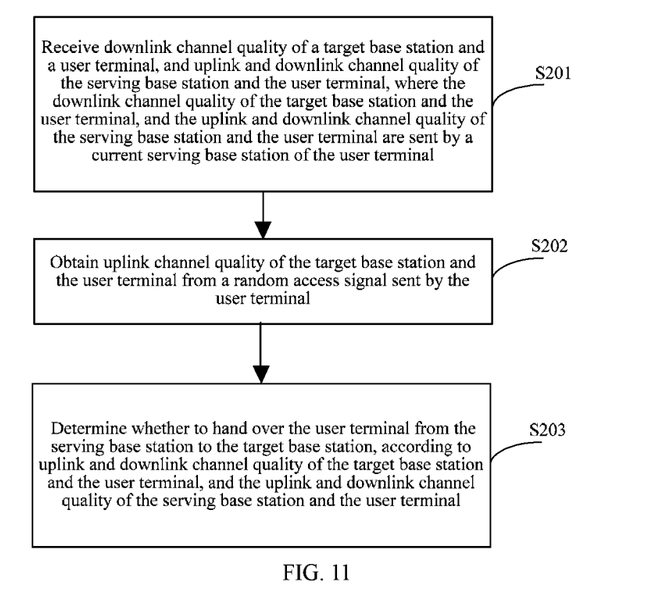
FIG. 11 is a flow chart of a cell handover method according to the present invention.

When an executor of the above steps, namely, the base station, is a target base station for cell handover performed by the user terminal, a handover procedure that the user terminal is handed over from the current serving base station to the target base station is shown in FIG. 11, which specifically includes:

S201: Receive downlink channel quality of the target base station and the user terminal, and uplink and downlink channel quality of the serving base station and the user terminal, where the downlink channel quality of the target base station and the user terminal, and the uplink and downlink channel quality of the serving base station and the user terminal are sent by a current serving base station of the user terminal.

S202: Obtain uplink channel quality of the target base station and the user terminal from a random access signal sent by the user terminal, where downlink signals of the target base station and the user terminal transmitted on a downlink channel are sent by the several LED lights and/or uplink signals of the target base station and the user terminal transmitted on an uplink channel are received by the several VLC/IR receivers.

S203: Determine whether to hand over the user terminal from the serving base station to the target base station, according to uplink and downlink channel quality of the target base station and the user terminal, and the uplink and downlink channel quality of the serving base station and the user terminal.

The wireless communication method provided by the embodiment of the present invention corresponds to transmission operations executed by the base station in the embodiment of the present invention. For a specific execution process of the wireless communication method, reference may be made to the foregoing base station embodiment, which is not repeated herein.

In the wireless communication method provided by the embodiment of the present invention, the base station may equate several LED lights for sending downlink VLC signals, and/or several VLC/IR receivers for receiving uplink VLC signals with radio remote units of a long term evolution LTE mode to perform baseband signal processing and resource management. Therefore, when an RF and VLC hybrid transmission manner is used, a VLC transmission manner is capable of reusing baseband signal processing and resource management manners in an existing LTE system, thereby simplifying resource management and baseband signal processing operations executed by the base station, and saving base station resources.

Finally, it should be noted that the above embodiments of the present invention are merely used for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, and such modifications or replacements do not make essence of corresponding technical solutions depart from scope of the technical solution of the embodiments of the present invention.

What is claimed is:
1. A base station, comprising:
a plurality of light emitting diode (LED) lights, configured to send downlink signals of an orthogonal frequency division multiple access (OFDMA) standard to a user terminal; and
a baseband signal processing unit, configured to designate the plurality of LED lights as radio remote units of a long term evolution (LTE) mode, and to perform, by using baseband signal processing and resource management modes from an LTE system, processing and resource management on the downlink signals sent by the plurality of LED lights;
wherein the plurality of LED lights are grouped into multiple LED light groups based on positions of the plurality of LED lights, and the baseband signal processing unit is further configured to associate each of the LED light groups with an independent carrier of the LTE mode;
wherein the base station further comprises a radio frequency (RF) transmitter and an RF receiver, wherein:
the RF transmitter is configured to send a downlink signal of the OFDMA standard to the user terminal by using an independent RF carrier;
the RF receiver is configured to receive an uplink signal of a single carrier frequency division multiple access (SC-FDMA) standard sent on the independent RF carrier by the user terminal; and
the baseband signal processing unit is further configured to perform, by using the baseband signal processing and resource management modes from the LTE system, carrier aggregation processing and resource management on downlink signals sent by the LED light groups and the RF transmitter and the uplink signal received by the RF receiver.

2. The base station of claim 1, wherein each of the LED light groups is configured to send, to the user terminal, a downlink signal that is of the OFDMA standard and has an independent frame structure.

3. The base station of claim 2, wherein each of the LED light groups comprises multiple LED light subgroups, wherein each LED light subgroup is configured to send a downlink signal that is of the OFDMA standard and of a different layer of LTE multiple-input multiple-output (MIMO) in a same frame structure to the user terminal.

4. The base station of claim 2, wherein each of the LED light groups corresponds to a visible light communication (VLC)/infrared ray (IR) (VLC/IR) receiver, and the VLC/IR receivers are configured to receive uplink signals of a single carrier frequency division multiple access (SC-FDMA) standard that have independent frame structures and are sent by the user terminal.

5. The base station according to claim 4, wherein the baseband signal processing unit is further configured to associate each of the LED light groups and corresponding VLC/IR receiver with a base station sector of the LTE mode, and perform, by using the baseband signal processing and resource management modes from the LTE system, processing and resource management on the downlink signals sent by the LED light groups and the uplink signals received by the VLC/IR receivers.

6. The base station according to claim 1, wherein multiple base station sectors receive uplink signals sent by the user terminal on different time frequency resources of the uplink signals that are of the SC-FDMA standard and that have the unified frame structure, and wherein the user terminal has a unified user identifier with respect to the base multiple station sectors.

7. The base station according to claim 6, wherein user terminals in the multiple base station sectors send the same random access sequences in different positions of the uplink signals, or the user terminals in the multiple base station sectors send different random access sequences in the uplink signals.

8. The base station according to claim 1, wherein the RF transmitter is further configured to broadcast, in a downlink channel of the RF carrier, the number of equivalent independent carriers supported by the base station and their corresponding LED light group identifiers.

9. The base station according to claim 1, wherein each of the LED light groups is further configured to broadcast, in a downlink channel of an independent carrier, a LED light group identifier corresponding to the equivalent independent carrier.

10. The base station according to claim 2, wherein each of the LED light groups is further configured to broadcast, in a downlink signal, uplink spectrum information of a corresponding base station sector.

11. The base station according to claim 1, wherein the base station is a target base station, and the baseband signal processing unit further comprises:
a receiving module, configured to receive downlink channel quality of the target base station and the user terminal, and uplink and downlink channel quality of a serving base station and the user terminal, wherein the downlink channel quality of the target base station and the user terminal, and the uplink and downlink channel quality of the serving base station and the user terminal are sent by a current serving base station of the user terminal;
an obtaining module, configured to obtain uplink channel quality of the target base station and the user terminal from a random access signal sent by the user terminal, wherein downlink signals transmitted on a downlink channel of the target base station and the user terminal are sent by the plurality of LED lights; and
a handover control module, configured to determine whether to hand over the user terminal from the serving base station to the target base station, according to uplink and downlink channel quality of the target base station and the user terminal, and the uplink and downlink channel quality of the serving base station and the user terminal.

12. The base station of claim 1, further comprising:
a plurality of visible light communication (VLC)/infrared ray (IR) (VLC/IR) receivers, configured to receive uplink signals of a single carrier frequency division multiple access (SC-FDMA) standard from the user terminal;
wherein the baseband signal processing unit is further configured to designate the several VLC/IR receivers as radio remote units of a long term evolution (LTE) mode, and to perform, by using the baseband signal processing and resource management modes from the LTE system, processing and resource management on the uplink signals received by the several VLC/IR receivers.

13. A wireless communication method, comprising:
designating, by a baseband signal processing unit of a base station, a plurality of light emitting diode (LED) lights as radio remote units (RRUs) of a long term evolution (LTE) mode and sending downlink signals of an orthogonal frequency division multiple access (OFDMA) standard to a user terminal; and performing, by the baseband signal processing unit using baseband signal processing and resource management modes from an LTE system, processing and resource management on the downlink signals sent by the plurality of LED lights;
wherein the plurality of LED lights are grouped into multiple LED light groups based on positions of the plurality of LED lights, and each of the LED light groups is associated with an independent carrier of the LTE mode;
wherein the method further comprises: receiving, by a radio frequency (RF) receiver, an uplink signal that is of a single carrier frequency division multiple access (SC-FDMA) standard and sent by the user terminal on an independent RF carrier;
wherein the sending the downlink signals comprises: sending, by an RF transmitter and each of the multiple LED light groups, downlink signals of the OFDMA standard to the user terminal;
wherein carrier aggregation processing and resource management are performed, by the baseband signal processing unit using the baseband signal processing and resource management modes from the LTE system, on downlink signals sent by the multiple LED light groups and the RF transmitter and the uplink signals received by the RF receiver.

14. The method according to claim 13, wherein the sending comprises:
sending, by each of the multiple LED light groups, a downlink signal to the user terminal that is of the OFDMA standard and has an independent frame structure.

15. The method according to claim 14, further comprising:
receiving, by visible light communication (VLC)/infrared ray (IR) (VLC/IR) receivers, uplink signals that are of a single carrier frequency division multiple access (SC-FDMA) standard and that have independent frame structures sent by the user terminal;
wherein each of the VLC/IR receivers corresponds to an LED light group of the multiple LED light groups.

16. The method according to claim 15, wherein each of the multiple LED light groups and its corresponding VLC/IR receiver are associated with a base station sector of the LTE mode by the baseband signal processing unit, and wherein processing and resource management are performed, by the baseband signal processing unit using the baseband signal processing and resource management modes from the LTE system, on the downlink signals sent by the LED light groups and the uplink signals received by the VLC/IR receivers.

17. The method according to claim 13, wherein the receiving comprises:
receiving, by the RF receiver, uplink signals that are sent by the user terminal for different base station sectors on different time frequency resources of the uplink signals that are of the SC-FDMA standard and have unified frame structure;
wherein user terminals have a unified user identifier with respect to the different base station sectors.

18. The method according to claim 17, further comprising:
receiving, by the RF receiver, the same random access sequences that are in different positions of the uplink signals and are sent by the user terminal in different base station sectors.

19. The method according to claim 17, further comprising:
receiving, by the RF receiver, different random access sequences that are in the uplink signals and are sent by the user terminal in different base station sectors.

20. The method according to claim 13, further comprising:
broadcasting, by the RF transmitter and in a downlink channel of the RF carrier, the number of separate carriers supported by the base station and corresponding LED light group identifiers.

21. The method according to claim 13, further comprising:
broadcasting, by each of the multiple LED light groups and in a downlink channel of an equivalent independent carrier, a LED light group identifier corresponding to the independent carrier.

22. The method according to claim 14, further comprising:
broadcasting, by each of the multiple LED light groups and in a downlink signal, uplink spectrum information of a corresponding independent carrier.

23. The method according to claim 14, further comprising:
receiving downlink channel quality of a target base station and the user terminal, and uplink and downlink channel quality of a serving base station and the user terminal, wherein the downlink channel quality of the target base station and the user terminal, and the uplink and downlink channel quality of the serving base station and the user terminal are sent by a current serving base station of the user terminal;
obtaining uplink channel quality of the target base station and the user terminal from a random access signal sent by the user terminal, wherein the downlink signals transmitted on the downlink channel of the target base station and the user terminal are sent by the plurality of LED lights; and
determining whether to hand over the user terminal from the serving base station to the target base station, according to uplink and downlink channel quality of the target base station and the user terminal, and the uplink and downlink channel quality of the serving base station and the user terminal.

* * * * *